Patented Aug. 14, 1951

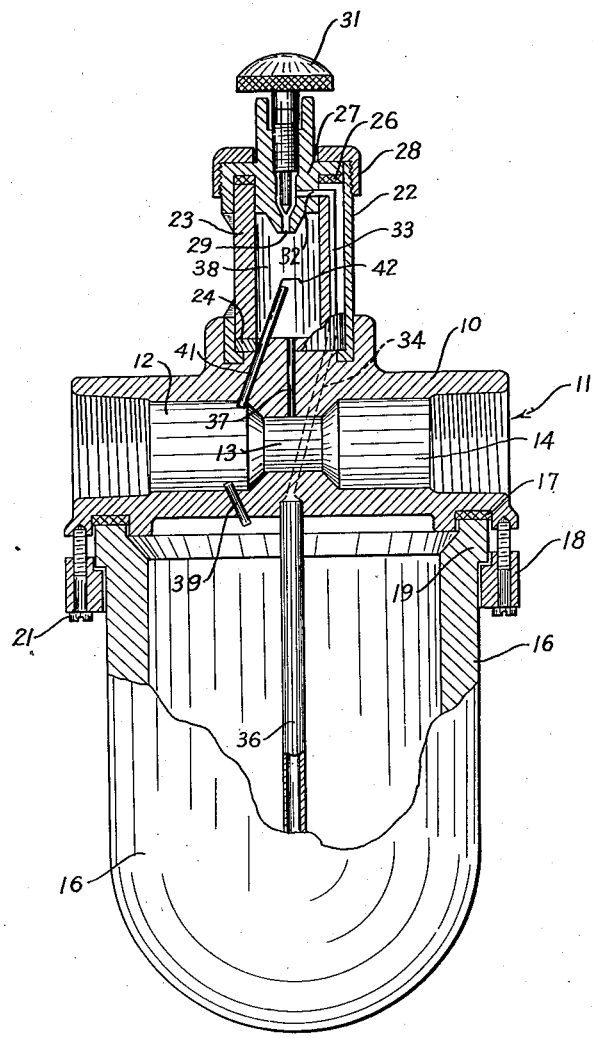

2,564,309

UNITED STATES PATENT OFFICE 2,564,309

LUBRICATOR WITH SECONDARY AIR CIRCUIT

Carl A. Norgren, Denver, Colo., assignor to C. A. Norgren Co., Denver, Colo., a corporation of Colorado Application October 12, 1949, Serial No. 120,853

6 Claims. (Cl. 184—55)

My invention refers to air line lubricators, particularly of the type adapted to deliver a very small quantity of oil to air flowing under pressure through the lubricator.

Several air line lubricators are currently available for delivering quantities of oil, such as several drops of oil per minute, to a stream of air flowing through the lubricator to a tool or other compressed air machine requiring lubrication. The rate of oil delivery from these lubricators is usually controlled by a needle valve or similar mechanism, which is reasonably satisfactory in instances where oil flows on the order of several drops per minute are required, since under such conditions, the orifice opening in the valve is fairly large. If, however, oil flows on the order of one or two drops per minute, or even one drop in two or more minutes are required, these lubricators become unsatisfactory since it is necessary, under such circumstances, to practically close the needle valve, leaving only a very small orifice through which the oil must pass. The oil usually contains minor amounts of small solid particles and in addition usually tends to oxidize or form a gum which, in a relatively short time, wholly or partially blocks the small orifice, thus reducing or completely stopping the flow of oil. Regulation of the oil flow under these circumstances is, therefore, not only difficult but is usually impossible to maintain over an extended period of time without continuous attention.

One of the primary objects of my invention is to overcome the above and other defects in known air line lubricators by providing an air line lubricator which will consistently deliver to a stream of air passing through my lubricator a small predetermined quantity of oil at a relatively constant rate over an extended period of time.

Other important objects of my invention include the provision of a lubricator of the type described which incorporates means for regulating the flow of oil and which, when regulated to discharge only a very small quantity of oil per minute, does not restrict the oil passage to a degree which renders probable the complete or partial blocking of the regulating orifice.

Other objects of my invention reside in various novel components and combinations thereof which are fully disclosed, together with the several advantages of my invention, in the following detailed description and in the appended drawing in which:

The figure of the drawing is a partial vertical cross section through my lubricator.

As illustrated, my lubricator includes a body 10 in which is formed an air conduit, generally designated 11, through which air under pressure passes from an inlet portion 12, through a center portion 13, and an outlet portion 14 to a tool or other mechanism requiring lubrication. The cross sectional area of the center portion 13 is less than the cross sectional area of either the inlet portion 12 or the outlet portion 14, thus requiring air passing through the conduit 11 to travel at a greater velocity through the center section 13 and thereby create a zone of reduced pressure. A bowl 16, adapted to contain lubricant such as oil, is sealed to the lower face of the body 10 in contact with a gasket 17 and is held in position by a peripheral ring 18 encompassing the bowl 16 and engaging lips 19 formed thereon. Bolts 21 extend through the ring 18 into engagement with the body 10.

A cylindrical metal gauge guard 22, having a plurality of openings formed in its wall, is sealed to the upper face of the body 10 immediately above the center portion 13. A hollow cylindrical transparent gauge glass 23, defining a chamber 38, is mounted within the guard 22 and rests upon a gasket 24. A gasket 26 extends around the upper edge of the gauge glass 23 and contacts a needle valve body 27, which extends downwardly a short distance into the gauge glass 23. A cap 28 is threaded to the guard 22 and holds the valve body 27 in firm engagement with the gasket 26. The valve body 27 is provided with an axial bore restricted at its lower end to form a discharge orifice 29. A regulating screw 31 is threaded in the bore and includes a conical point, the position of which controls the effective opening of the orifice 29. The valve body 27 also includes a small laterally extending passageway 32 which communicates with a bore 33 formed in the gauge glass 23. A passage 34 formed in the body 10 connects the passage 33 with a pendant tube 36, the latter extending downwardly towards the lower portion of the bowl 16.

A passage 37 extends through the body 10 interconnecting the lower portion of the chamber 38, defined by the gauge glass 23 with the center portion 13 of the conduit 11. Another passage 39, preferably in the form of a tube, interconnects the inlet portion 12 of the conduit 11 with the interior of the bowl 16, thus permitting the introduction of air at inlet pressure into the bowl. A passage 41, preferably in the form of a tube, extends from the inlet portion 12 into the chamber 38, preferably terminating in the lower portion of said chamber. A baffle 42 may be secured to the tube 41 or otherwise and extends across the discharge end of the tube 41.

In operation by lubricator is inserted in an air line through which air is conveyed to a tool or other mechanism requiring lubrication. The bowl 16 is filled with oil and the rate of oil delivery adjusted by movement of the regulating screw 31. When the air in the conduit 11 is not in motion, the pressures in the bowl 16 and in the chamber 38 are equal with a result that no oil is delivered. However, as the air flows through the center portion 13, it creates a zone of reduced pressure which is, in turn, communicated to the chamber 38 through the passage 37. The pressure in the bowl 16 is maintained at inlet pressure by the tube 39, thus creating a pressure differential which draws oil from the bowl 16 through the tube 36, passage 34, passage 33, passage 32 and orifice 29 into the chamber 38. The oil falls from the orifice 29 in the form of drops which eventually pass through the passage 37 into the conduit 11 forming a fog which is carried by the air stream to the tool.

The maximum possible pressure differential is not established in my lubricator, however, because of the tube 41 which is controlled as to length and bore to deliver to the chamber 38 a volume of air somewhat less than that capable of discharge through the passage 37. The baffle 42, being disposed over the discharge end of the tube 41, prevents the turbulence of the air entering through tube 41 from disturbing the formation of an oil droplet at the orifice 29. The air entering from tube 41 is drawn outwardly, together with the oil, through the passage 37 into the conduit 11. I have found that the oil falling in droplet form from the orifice 29 is at least partially atomized before passing through the opening 37, the atomization being completed upon discharge of the oil and air mixture from the passage 37 into the center portion 13.

Since the effect of the tube 41 is to reduce the pressure differential effective for drawing oil into the stream of air passing through the conduit 11, it will be found that the regulating screw 31 may be opened a considerable distance even when flows on the order of a drop in two or more minutes are desired, with the result that there is very little tendency for the opening in the valve to clog either by the formation of gum around or near the orifice 29, or by the lodgement of solid particles in the valve. Furthermore, it is believed that the atomization of the oil is considerably improved since a mixture of oil and air rather than oil alone passes through the passage 37.

It may be seen that the bore and length of the tube 41 controls, by its relationship with the bore and length of passage 37, the degree to which the effective pressure differential is reduced and this reduction may, therefore, be easily regulated in the process of fabrication. It will also be understood that the pressure of the air in the inlet portion 12 is only slightly greater than the pressure of the air in the outlet portion 14, both of these being greater than the pressure in the center portion 13. The tube 41 may therefore interconnect the chamber 38 with the outlet portion 14 if desired, although I do not consider such a structure as satisfactory as that illustrated in the figure.

The foregoing detailed description has been made in compliance with R. S. 4888 and constitutes a preferred embodiment of my invention. However, since various modifications in the details of construction will be obvious to those skilled in the art, I do not bind myself to the precise construction disclosed except insofar as defined in the appended claims.

I claim:

1. An air line lubricator comprising a body having an air conduit formed therein including a zone of reduced cross sectional area, a bowl sealed to the lower surface of the body, a gauge glass sealed to the upper surface of the body defining a chamber, said body having a first passage for conveying air at inlet pressure into the bowl, a second passage for conveying oil from the bowl to the upper portion of the chamber, and a third passage interconnecting the lower portion of the chamber with the zone of reduced cross sectional area in the air conduit, a valve in said second passage, and conduit means in the body for admitting air at approximately inlet pressure to the chamber.

2. An air line lubricator comprising a body having an air conduit formed therein including a zone of reduced cross sectional area, a bowl sealed to the lower surface of the body, a gauge glass sealed to the upper surface of the body defining a chamber, said body having a first passage for conveying air at inlet pressure into the bowl, a second passage for conveying oil from the bowl to the upper portion of the chamber, and a third passage interconnecting the lower portion of the chamber with the zone of reduced cross sectional area in the air conduit, a valve in said second passage, and conduit means interconnecting the said chamber and air conduit for admitting a limited volume of air at approximately inlet pressure to the chamber.

3. An air line lubricator comprising a body having an air conduit formed therein including a zone of reduced cross sectional area, a bowl sealed to the lower surface of the body, a gauge glass sealed to the upper surface of the body defining a chamber, said body having a first passage for conveying air at inlet pressure into the bowl, a second passage for conveying oil from the bowl to the upper portion of the chamber, and a third passage interconnecting the lower portion of the chamber with the zone of reduced cross sectional area in the air conduit, a valve in said second passage, a conduit for admitting a limited volume of air at approximately inlet pressure to the chamber, and a baffle in the chamber transverse to the conduit and spaced therefrom for reducing air turbulence within the chamber.

4. An air line lubricator comprising a body having an air conduit formed therein including a zone of reduced cross sectional area, a bowl sealed to the lower surface of the body, a gauge glass sealed to the upper surface of the body defining a chamber, said body having a first passage for conveying oil from the bowl to the upper portion of the chamber, a second passage interconnecting the lower portion of the chamber with the zone of reduced cross sectional area in the air conduit, and a third passage for conveying air at approximately inlet pressure from the air conduit to the bowl, a valve in said first passage, a conduit for admitting air from the air inlet at approximately inlet pressure to the chamber, the air delivery capacity of said conduit being less than the air delivery capacity of said third passage, and baffle means in the chamber near the discharge end of said conduit for reducing the turbulence of air in the chamber.

5. An air line lubricator comprising a body having an air conduit formed therein, including a center portion of reduced cross sectional area, an inlet portion and an outlet portion, a bowl sealed to the body, a hollow gauge glass sealed to the body above the air conduit defining a chamber, first passage means in the body for conveying air from said inlet portion to the bowl, second passage means in the body for carrying oil from the bowl to the upper portion of the chamber, third passage means in the body for carrying oil and air from the lower portion of the chamber to the center portion of the air conduit, a needle valve in the second passage for regulating the flow of oil therein, and a tube interconnecting the chamber with the inlet portion of the air conduit, said tube having an air delivery capacity less than that of said third passage means.

6. An air line lubricator comprising a body having an air conduit formed therein, including a center portion of reduced cross sectional area, an inlet portion and an outlet portion, a bowl sealed to the body, a hollow gauge glass sealed to the body above the air conduit defining a chamber, first passage means in the body for conveying air from said inlet portion to the bowl, second passage means in the body for carrying oil from the bowl to the upper portion of the chamber, third passage means in the body for carrying oil and air from the lower portion of the chamber to the center portion of the air conduit, a needle valve in the second passage for regulating the flow of oil therein, a tube interconnecting the chamber with the inlet portion of the air conduit, said tube having an air delivery capacity less than that of said third passage means, and a baffle over the discharge end of the tube in the chamber for deflecting air toward said third passage means.

CARL A. NORGREN.

REFERENCES CITED

The following references are of record in the file of this patent:

UNITED STATES PATENTS

| Number | Name | Date |
| --- | --- | --- |
| 1,782,741 | Norgren | Nov. 25, 1930 |
| 2,223,700 | Norgren | Dec. 3, 1940 |
| 2,442,777 | Norgren | June 8, 1948 |